Aug. 7, 1928.

E. C. OLIVER 1,679,872

TWIST DRILL GRINDER

Filed Oct. 9, 1925      3 Sheets-Sheet 1

INVENTOR.
Edo C. Oliver
BY
ATTORNEY.

Aug. 7, 1928.
E. C. OLIVER
1,679,872
TWIST DRILL GRINDER
Filed Oct. 9, 1925      3 Sheets-Sheet 2
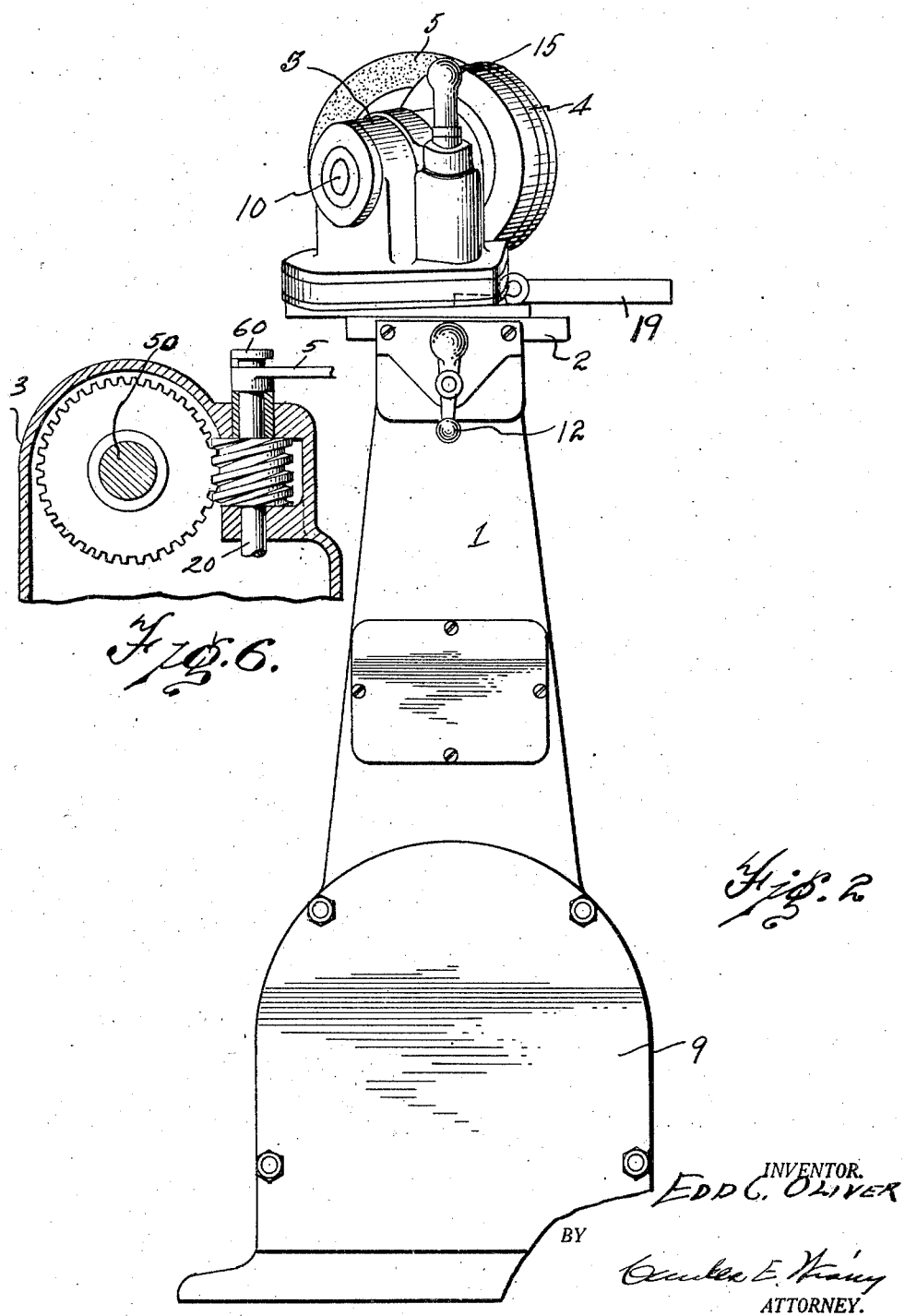
INVENTOR.
Edd C. Oliver
BY
ATTORNEY.

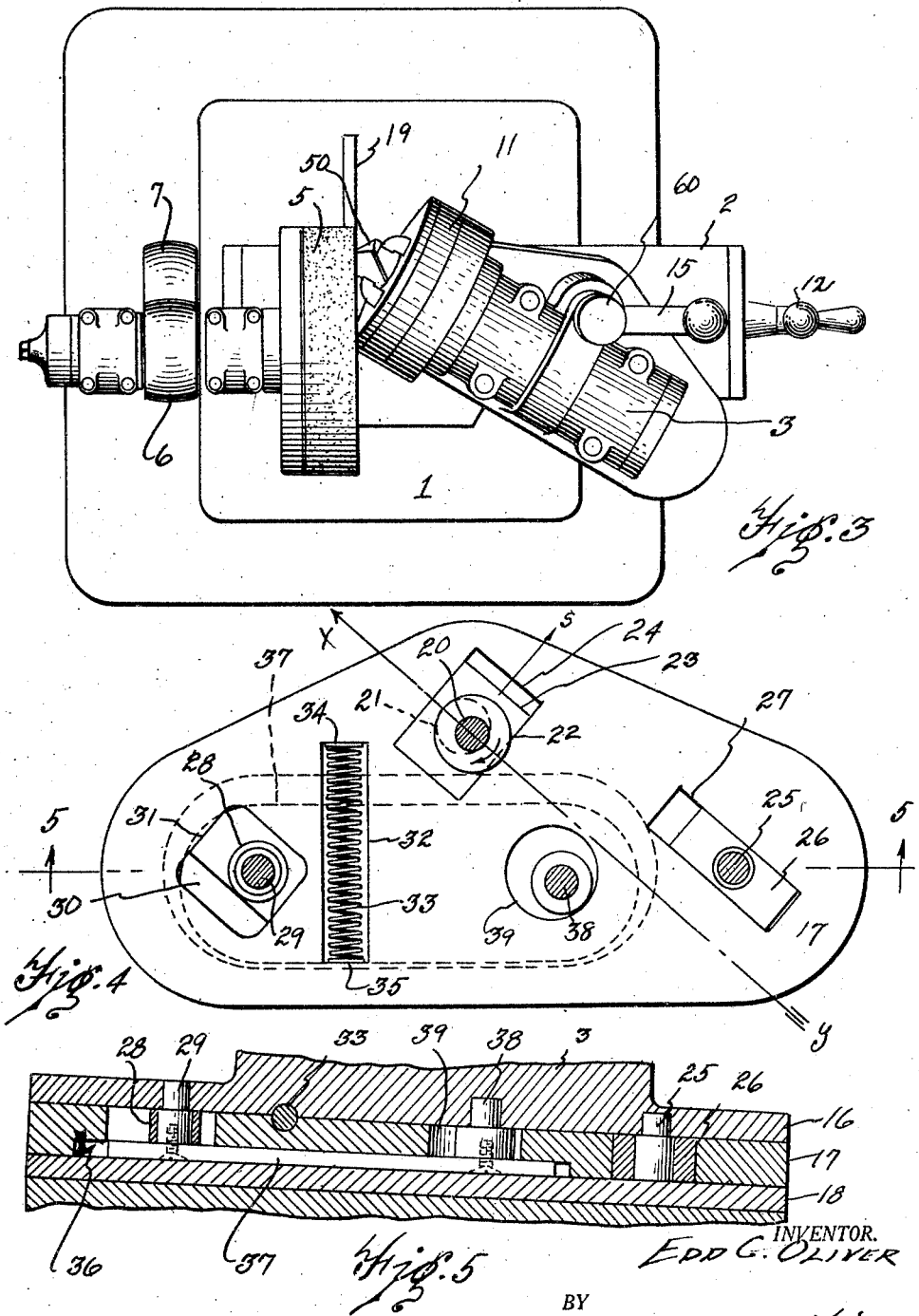

Patented Aug. 7, 1928.

1,679,872

UNITED STATES PATENT OFFICE.

EDD C. OLIVER, OF ADRIAN, MICHIGAN.

TWIST-DRILL GRINDER.

Application filed October 9, 1925. Serial No. 61,434.

This invention relates to drill grinders, and the object is to provide a simple and comparatively inexpensive device for grinding the cutting ends of twist drills having two or more lips as the case may be.

The purpose of the machine is to form automatically a drill with a cutting point or end of the form shown in my U. S. Patent No. 1,467,491 of September 11, 1923.

A further object of this invention is to secure a mechanism that moves the drill across the grinding wheel and automatically turns the same and feeds the drill longitudinally toward the wheel during the grinding interval.

A further object of the invention is to provide a very simple mechanism for the performance of the functions above stated and that may be operated by hand, the mechanism being of such simplified form that it is comparatively inexpensive to manufacture and of such character that an ordinary workman may place the drill in the machine and by a hand operation actuate the mechanism to automatically form the drill point stated. These and other objects and the several novel features of the invention are hereinafter more fully described and claimed, and the preferred form of construction of a grinding machine embodying my invention is shown in the accompanying drawings in which—

Fig. 2 is an elevation of the machine taken from the right side of Fig. 1.

Fig. 3 is a plan view of the machine.

Fig. 4 is a plan view of one of the plates on which the drill grinding head is mounted showing the means for giving the mounting a peculiar motion for the formation of the drill point.

Fig. 5 is a section taken on line 5—5 of Fig. 4.

Fig. 6 is a detail showing the means for rotating the drill.

Figure 1:
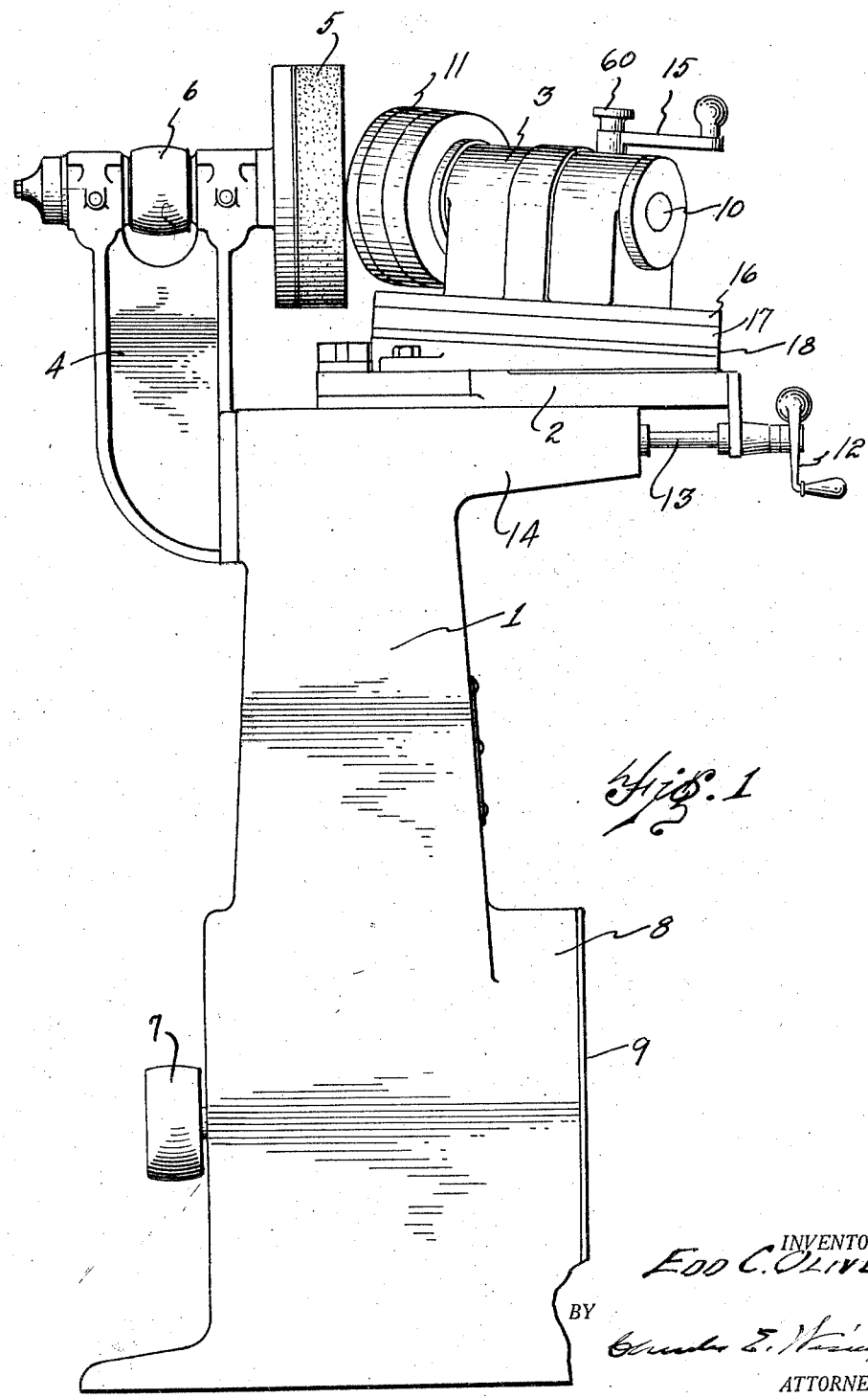
Fig. 1 is a side elevation of the machine.

The general appearance of the machine is shown in Figs. 1 and 2 which consists of a standard 1 and a table 2 on the head thereof on which is mounted the drill holder indicated generally at 3. A bracket 4 is provided on one side of the machine at the top having bearings for the shaft of the grinding wheel 5 and between the said bearings is the pulley 6 for rotating the grinding wheel.
This pulley 6 is driven by a belt (not here shown) from the pulley 7 which is to be understood as being connected with a motor in the base of the machine, it being formed with the housing 8 provided on one side with a cover 9 covering the hollow recess within which the motor is to be understood as being secured. The drill holder spindle 10 is provided with a chuck 11 at one end in which the drill is to be secured as will be understood from Fig. 3. The table 2 carrying the drill holder is movable toward and from the grinding wheel by the rotatable handle 12 which is attached to a shaft 13 extending into the top 14 of the standard and is there provided with a feed screw (not shown) of the usual type of feeding mechanism. The drill spindle is revolved by means of a handle 15 connected to the drill holder spindle 12 by a pair of two to one helical gears (not here shown) but by means of which rotation of the handle turns the spindle and consequently the chuck and drill carried thereby. The drill is inserted in the machine as may be understood from Fig. 3 and has one of the cutting lips thereof occupying a horizontal plane with the handle in the position shown in Fig. 3. The turning of this handle 15 rotates the drill and the drill is moved across the grinding wheel and toward the grinding wheel by the following described mechanism.

The spindle holder 3 is mounted on a plate 16 which is slidably mounted on a plate 17. The plate 17 is in fixed relation with the plate 18 which in turn is fastened to the base 2 of the machine, the said base 2 being movable by means of the screw 13 in a direction parallel with the axis of the grinding wheel as heretofore stated. The drill 50 is supported in the chuck 11 and is positioned by means of a gauge 19 carried on the plate 16 at the forward end as will be understood from Fig. 3. The chuck may be of any approved form preferably one which will "chuck" the drill by the point.

There is a peculiar movement of the drill necessary relative to the stationarily positioned revolving grinding wheel to secure the shape of the point shown in my said Patent No. 1,357,027 and also shown in my pending application U. S. Patent No. 1,546,-453 issued July 21, 1925. This movement is secured by rotation of the handle 15, which is attached to a vertical shaft 20 passing through the spindle housing. The shaft 20 is to be understood as being in geared relation with the spindle or chuck carrying the drill in two to one relationship so that one turn of the handle 15 makes a half revolution of the spindle and drill point, this being the gear relationship required in what is known as the "two-lipped drill". By changing the gear ratio these machines may be made to grind drills of a different number of lips. There is a knob 60 on the upper end of the shaft 20 to which the handle is attached, a cross section of the shaft is shown in Fig. 4 and the knob 60 is used to fasten the handle 15 in place for the purpose hereinafter described. On the lower end of the shaft 20 is provided an eccentric indicated by dotted lines 21 in Fig. 4 and the shaft above this eccentric is provided with an enlarged concentric portion 22. This concentric portion 22 is positioned in a recess provided in the plate 16 on which the spindle housing is mounted the base of the housing being indicated at 3 in Fig. 5. The eccentric portion 21 is rotatable in a block 23 shown in Fig. 4 and this block rides in a recess 24 in the stationary plate 17 fitting the recess in the direction of the arrow x—y and having freedom of movement in the direction of the arrow S at a right angle to the arrow x—y. Inasmuch as the concentric portion 22 of the shaft 20 fits a recess provided therefor in the movable plate 16 and inasmuch as the block 23 is in a fixed plate 17, rotation of the shaft and eccentric will, on the turning of the shaft and the eccentric to the position shown in Fig. 4, move the upper plate toward the y end of the arrow x—y, the general line of movement of the plate being on the line of the arrow x—y and having freedom of movement in the direction of the arrow S at a right angle to the arrow x—y. Inasmuch as the concentric portion 22 of the shaft 20 fits a recess provided therefor in the movable plate 16 and inasmuch as the block 23 is in a fixed plate 17, rotation of the shaft and eccentric will, on the turning of the shaft and the eccentric to the position shown in Fig. 4, move the upper plate toward the y end of the arrow x—y, the general line of movement of the plate being on the line of the arrow x—y first toward x and then toward y. The plate 16 also has a pin 25 therein which extends into a block 26 positioned in a recess 27 of the plate 17. This block 26 has freedom of movement in the direction of the arrow x—y and confines this point of the plate 16 to movement approximately in the direction indicated by the arrow.

At the left side of Fig. 4 is shown a roller 28 on a pin 29, the pin being attached to the plate 16 and the roller engaging the face of a cam 30 in a recess 31 provided in the plate 17. The face of the cam 30 engaged by the roller practically parallel with the arrow x—y but may lie at a slight angle thereto. Normally there is space in the aperture 31 between the roller and the opposite side of the aperture at a right angle to the direction x—y. There is also mounted in a recess 32 formed between the plates 16 and 17 a compression spring 33, one end 34 of which engages the plate 17 and the other end 35 of which engages the plate 16. This spring forces the roller 28 to contact with the cam face 30. The plate 17 is also provided with a recess 36 in the under side indicated by dotted lines in Fig. 4. A plate 37 also indicated by dotted lines in Fig. 4 and less in size than the recess 36 is secured to the pins 29 and 38 attached to the plate 16. The pin 38 is in a recess 39 in the plate 17 which is larger than the end of the pin and permits movement of the plate 16. The plate 37, which is shown in full lines in Fig. 5, is utilized to hold the plate 16 in sliding contact with the upper surface of the plate 17.

Movement of the parts occasioned by turning the handle 15 will be understood to be as follows: With a drill practically brought to grinding position by means of the table 2 and screw 13 the handle is in the position shown in Fig. 3 and with the cam 21 in the position shown in Fig. 4. In this position of the cam 21, the top plate 16 is forced to the limit of its movement in the direction y of the arrow x—y. Turning of the handle 15 one revolution will turn the drill one-half a revolution and rotation of the handle and the cam member 21 is in the direction of the arrow shown in Fig. 4. The first half turn of the handle causes the plate 16 to move forward in the direction of the arrow x—y and the block 23 will move in the direction of the arrow S until the member 16 has reached the limit of its travel toward x, the block 23 moving in its recess 24 in the direction of the arrow S and then returning to the position shown in Fig. 4. Further turning of the eccentric and handle in the direction shown by the arrow, after the block contacts the wall of the recess 24, forces the plate 16 to the right in the direction of the arrow S. This is due to the block 23 being in the fixed plate 17 while the eccentric 21 and shaft 20 is carried by the movable plate 16. During this second half of rotation of the eccentric 21, the roller 38 is forced out of contact with the cam surface 30 and is returned thereto by the spring which is interposed between the plates 16 and 17 as above described. During this turning of the eccentric one revolution, the first half of the turn feeds the drill forward into the grinding wheel and the second half of which swings it to the right causing the drill point to move toward the edge of the grinding wheel. It should be borne in mind that during these movements of the plates 16 and drill holder, the drill is being rotated and as the point of the drill comes to the edge of the grinding wheel, whose axis is stationary, the point of the drill is undercut to the rear of the land and the face of the land has the shape of an oblique helicoid as is described in my said Patent No. 1,467,491.

By this arrangement of the parts the drill is caused to move in a peculiar manner while being rotated, it being fed into the grinding wheel, turned during this grinding and moved across the face of the wheel all by operation of a single crank and thus provides a hand operated tool. This tool is particularly useful in shops where there is not an excessive amount of drill grinding to be done and therefore can supply a market not reached by more expensive structures such for instance as is shown in my pending application Serial No. 484,027 and yet a drill point that is shown in my said pending application and having the effectiveness in operation as is described in my said Patent No. 1,467,491 may be secured by a hand operated tool of comparatively inexpensive form.

Having thus fully described my invention, what I claim is—

1. In a machine for grinding twist drills, a frame member, a fixedly positioned rotatable grinding wheel, a holder for the drill for maintaining the same in a fixed angular relation with the face of the grinding wheel and adapted to be moved to move the drill across the grinding wheel, manual means for turning the drill on its axis during grinding movement, and automatic means actuated through the said means for turning the drill for causing the drill to feed longitudinally of its axis toward the grinding wheel as it is turned.

2. In a machine for grinding twist drills, a frame member, an axially fixed grinding wheel, means for rotating the wheel, a holder for the drill by means of which the drill is maintained in the desired angular relation with the face of the grinding wheel, manually operable means for simultaneously turning the drill on its axis and moving the holder to cause the drill to traverse the grinding wheel and feed the drill on its longitudinal axis toward the grinding wheel during its movement thereacross.

3. In a machine for grinding twist drills, an axially fixed grinding wheel, means for rotating the wheel, a drill holder, manually controlled mechanism for causing the drill end to be moved across the face of the grinding wheel and simultaneously turn the drill, the parts cooperating to grind the face of each lip of the drill in the form of an oblique helicoid in which all radial lines at the surface are practically parallel with the imaginary cone formed by rotation of the cutting edge of the lip to near the point of the web intersection and extending to the point on a curve providing an increased clearance forward of the point at the rear of the lip.

4. In a machine for grinding twist drills, an axially fixed grinding wheel, means for rotating the wheel on its axis, a holder having its longitudinal axis at an angle to the axis of the grinding wheel, and means for causing the holder to move the drill across the grinding wheel and simultaneously turn the same and feed axially toward the grinding wheel as it is turned.

5. In a machine for grinding twist drills, a framework, an axially fixed grinding wheel mounted thereon, means for rotating the grinding wheel, a holder having its longitudinal axis at an angle to the axis of the grinding wheel, mechanism adapted to be actuated to move the drill end toward and across the face of the grinding wheel and turn the drill while being so moved, and manual means for actuating the mechanism.

6. In a machine for grinding twist drills, an axially fixed grinding wheel, means for rotating the same, a holder for the drill, automatic means for causing the holder to move the drill end across the face of the wheel, to turn the same as it is moved, and to feed the same axially toward the wheel, and manual means by which the automatic mechanism is actuated.

7. In a machine for grinding twist drills, a rotatable grinding wheel, a drill holder arranged to hold the drill at an angle to the face of the grinding wheel, manually operable mechanism to cause a traverse of the drill end relative to the face of the grinding wheel, to turn the drill during the said traverse, and to cause one of the elements to move toward the other on the axial line of the drill to increase the grinding effect as the drill is turned.

8. In a machine for grinding twist drills, an axially fixed grinding wheel, means for rotating the same, a holder having its longitudinal axis at an angle to the axis of the grinding wheel, a table on which the holder is mounted, manual means for turning the drill on its axis, and means connected with said turning means for causing the table to move to carry the end of the drill across the face of the grinding wheel.

9. In a machine for grinding twist drills, an axially fixed grinding wheel, means for rotating the same, a chuck for holding the drill, a table on which the chuck is mounted, manual means for turning the said chuck to turn the drill, and means connected with said turning means for causing the table to move and move the drill end across the face of the grinding wheel with the drill axis at an angle to the face of the wheel and to feed the drill axially toward the wheel during the grinding movement.

10. In a machine for grinding twist drills, a framework, a grinding wheel mounted thereon in axially fixed position, means for rotating the wheel, a base movable in a direction parallel with the axis of the grinding wheel, a table on the said base, a drill holder mounted on the table arranged to hold the drill with its longitudinal axis at an angle to the face of the grinding wheel, means for turning the holder to rotate the drill and means connected with the said holder rotating means for causing the table to move and carry the drill point across the face of the grinding wheel and feed the same axially toward the grinding wheel as the drill is turned.

11. In a machine for grinding twist drills, a framework, a grinding wheel rotatably supported thereon in axially fixed position, a base movable in a direction parallel with the axis of the grinding wheel, a table on the base, a drill holder mounted on the table arranged to hold the drill with its longitudinal axis at an angle to the face of the wheel, manual means for turning the holder to rotate the drill, an eccentric connected with the said manual means for causing the table to move and thereby move the drill on its longitudinal axis toward the grinding wheel, the eccentric being so arranged that said manual means first causes the drill to move across the face of the wheel as it is turned and then to cause the drill to feed on its axial line toward the face of the grinding wheel as the drill point reaches the periphery of the wheel.

In testimony whereof I sign this specification.

EDD C. OLIVER.